United States Patent
Yasuo et al.

Patent Number: 5,238,754
Date of Patent: Aug. 24, 1993

[54] SOLID OXIDE FUEL CELL SYSTEM

[75] Inventors: Takashi Yasuo; Yukinori Akiyama; Noboru Ishida; Shuzo Murakami, all of Osaka; Toshihiko Saitoh, Kyoto, all of Japan

[73] Assignee: Sanyo Electric Co., Ltd., Osaka, Japan

[21] Appl. No.: 932,246

[22] Filed: Aug. 19, 1992

[30] Foreign Application Priority Data

Sep. 3, 1991 [JP] Japan ............... 3-222789

[51] Int. Cl.$^5$ .............................. H01M 8/10
[52] U.S. Cl. ........................ 429/30; 429/34; 429/39
[58] Field of Search ............ 429/30, 32, 33, 34, 429/38, 39, 26

[56] References Cited

U.S. PATENT DOCUMENTS

| | | |
|---|---|---|
| 4,463,065 | 7/1984 | Hegedus et al. |
| 4,615,107 | 10/1986 | Kumeta et al. |
| 4,857,420 | 8/1989 | Maricle et al. ............... 429/30 |
| 4,894,294 | 1/1990 | Ashizawa et al. ............ 429/27 X |
| 4,943,494 | 7/1990 | Riley ............................ 429/30 |
| 4,997,726 | 3/1991 | Akiyama et al. |
| 5,100,744 | 3/1992 | Harashima .................... 429/34 X |
| 5,171,646 | 12/1992 | Rohr ............................. 429/34 |

FOREIGN PATENT DOCUMENTS

| | | |
|---|---|---|
| 0425939 | 5/1991 | European Pat. Off. |
| 58-155669 | 9/1983 | Japan . |
| 59-35368 | 2/1984 | Japan . * |
| 2148045 | 5/1985 | United Kingdom . |
| 9004860 | 5/1990 | World Int. Prop. O. |

OTHER PUBLICATIONS

T. Kahara et al., "Status of Large Sized MCFC Cell & Stack Technology Development at Hitachi," Fuel Cell Seminar, Nov. 25-28, 1990.

Primary Examiner—Anthony Skapars
Attorney, Agent, or Firm—Wegner, Cantor, Mueller & Player

[57] ABSTRACT

The present invention provides a solid oxide fuel cell system comprising a stack including a layer of a number of cell units and separators alternated with each other, and characterized in that a set of cell units are placed on one surface between the separators, wherein each cell unit in the set is separately placed on the surface crossing at right angles to the layered direction, and wherein internal manifolds for fuel gas supply/exhaust and internal manifolds for oxidant gas supply/exhaust are formed around each cell unit, and all of them are formed through the separators.

19 Claims, 7 Drawing Sheets

SOLID OXIDE FUEL CELL SYSTEM

BACKGROUND OF THE INVENTION (1) Field of the Invention

The present invention relates to a solid oxide fuel cell(SOFC) system, especially, to a large-sized SOFC system.

(2) Description of the Related Art

Fuel cells convert chemical energy of supplied gas into electric energy, therefore, offer great potential in efficient generation of electricity. Particularly, solid oxide fuel cells have attracted considerable attention as the fuel cells of the third generation following phosphoric acid fuel cells (PAFC) and molten carbonate fuel cells (MCFC) of the first and second generations, respectively.

The solid oxide fuel cells have an advantage in enhancing efficiency of generation of electricity, including waste heat management, with their operation at high temperature, approximately 1000° C. Such an advantage is the basis for the study of enlargement of the solid oxide fuel cells in order to generate the mass current.

An electrolyte used in the solid oxide fuel cells is stabilized zirconium oxide (YSZ), that is, a product with defective fluorite structure obtained by doping yttrium oxide ($Y_2O_3$) of approximately 8 mol% into zirconium oxide ($ZrO_2$).

However, stabilized zirconium oxide retains low ion conductivity which is one of the factors that affects cell characteristics, therefore, it should be made into thin films in order to enhance the conductivity. On the other hand, inferior physical strength of the stabilized zirconium oxide films makes it quite difficult to produce enlarged solid oxide fuel cells. Accordingly, the study of electrolyte in its enforcement by mixing aluminum oxide ($Al_2O_3$) therewith and its enlargement by having zirconium oxide deposit on an anode used as a supporter by vapor deposition (a substrate structure type) has been conducted, however, possible solutions for the enlargement of the solid oxide fuel cells are still in the quest. Moreover, even if a cell unit comprising one enlarged electrolyte is successfully produced, the accordingly extended distance between a gas inlet and a gas outlet contributes to an uneven temperature in a stack, and therefore, characteristics deterioration thereof.

SUMMARY OF THE INVENTION

The present invention has an object to provide a large-sized solid oxide fuel cell system capable of minimizing unevenness of the temperature in the stack in order to maintain stable characteristics thereof.

The object is fulfilled by a solid oxide fuel cell system comprising at least one stack including a layer of a number of cell units and separators alternated with each other, and characterized in that a set of cell units are placed on one surface between the separators, wherein each cell unit in the set is separately placed on the surface crossing at right angles to the layered direction. Each cell unit may be smaller than the separator and includes an anode, a cathode, and an electrolyte placed therebetween.

Having a number of cell units in a surface makes it possible to increase the total area of the cell units, hence to enlarge the solid oxide fuel cell system in order to generate the mass current. In addition, stress intensity on the electrolyte in each cell unit can be minimized by making it smaller than the separator, which contributes to the prevention of damages thereof, resulting in enhancement of reliability of the solid oxide fuel cell system.

Internal manifolds for fuel gas supply/exhaust and internal manifolds for oxidant gas supply/exhaust may be formed around each cell unit, and all of them may be formed through the separators.

Maintaining each cell unit small coupled with the above construction makes it possible to shorten the distance between the internal manifolds for gas supply and those of gas exhaust, thereby minimizing the unevenness of the temperature in the stacks.

The internal manifolds for each gas supply may be formed closer to the center of the separator than the internal manifolds for each gas exhaust and the solid oxide fuel cell system may include construction by which the fuel gas and oxidant gas flow at right angles to each other in each cell unit.

With the above construction capable of having each gas flow from inward to outward, the substantially even distribution of temperature in the surface of each cell unit can be realized.

The solid fuel cell system may have construction by which the fuel and the oxidant gas flow in the layered direction reversely in their internal manifolds and the solid fuel cell system may include a first gas supply/exhaust plate having a gas inlet and a gas outlet communicating with internal manifolds placed at one of the bottom and top of the stack, and a second supply/exhaust plate having a gas inlet and a gas outlet communicating with the internal manifolds placed at the other side of the stack, and wherein the fuel gas is supplied through one of the first and second gas supply/exhaust plates and the oxidant gas is supplied through the other plate.

Also with the above construction capable of having the fuel gas and oxidant gas flow in an opposite direction, the substantially even distribution of temperature in a surface of the layered direction can be realized.

In the solid oxide fuel cell system, at least one coolant flow path formed through the separators may be formed around each cell unit. A number of coolant holes are formed around each cell unit which constitute the coolant flow path in the layered direction may be formed around each cell unit and the coolant holes may become larger in diameter in proportion to the distance from the center of the separators. All the coolant holes may be placed farther from the cell units than the internal manifolds.

The above construction for supplying coolant through a number of coolant flow paths, and particularly, increasing the supply for the ones closer to the internal manifolds for each gas exhaust, through which each exhaust gas carrying heat of reaction flows, contributes to minimize the unevenness of the temperature in the stack.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Example 1

Figure 1:
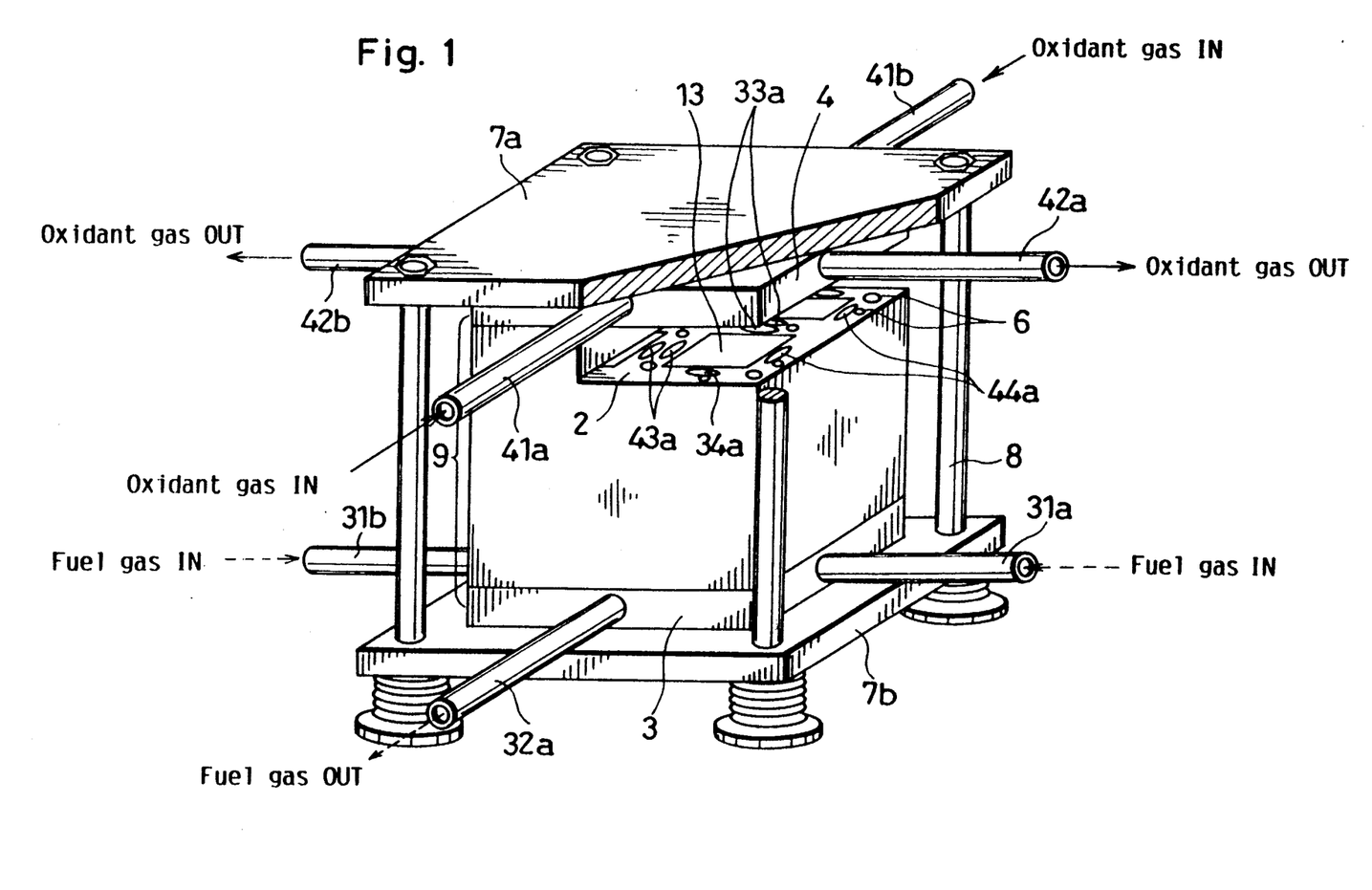
FIG. 1 is a cross section of the major part of a solid oxide fuel cell system of the present invention.

As shown in FIG. 1, a solid oxide fuel cell system of the present invention comprises a stack 9 sandwiched by two holders 7a and 7b, and four supporters 8 supporting the holders 7a and 7b.

Figure 3:
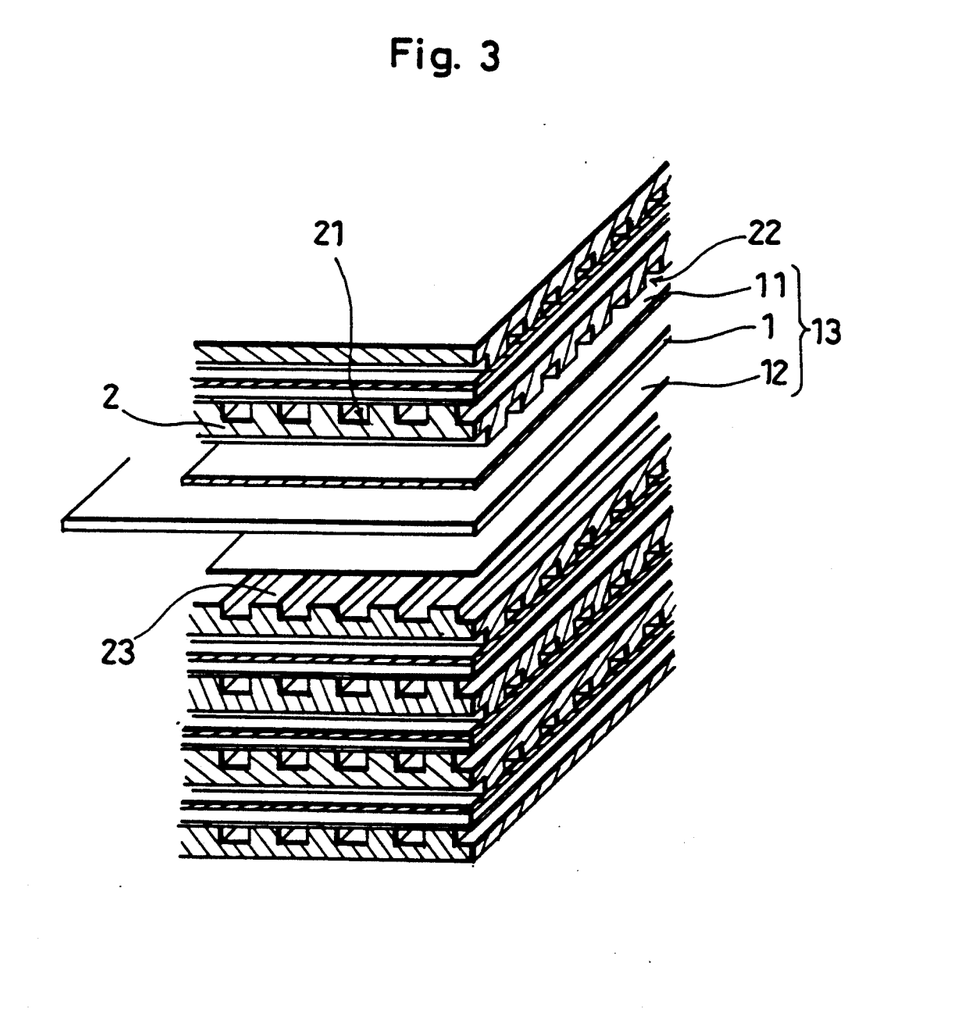
FIG. 3 is an X—X transverse section view of FIG. 2.

The stack 9 has a layered construction comprising a fuel gas supply/exhaust plate 3 at the bottom, an oxidant gas supply/exhaust plate 4 at the top, and an intermediate layer of a number of sets of cell units 13 and separators 2 alternated with each other and extended vertically as shown in FIG. 3, wherein the first set of the cell units 13 is placed On the fuel gas supply/exhaust plate 3 and the oxidant gas supply/exhaust plate 4 is placed on the last separator 2.

As shown in FIG. 3, each cell unit 13 comprises an electrolyte 1 (specification : 50 mm ×50 mm) made of baked stabilized zirconium oxide doped by 8% yttrium oxide, a cathode 11 placed on one surface thereof, and an anode 12 placed on the other surface thereof. The cathode 11 is made of perovskite type oxides such as LaMnO$_3$ and the anode 12 is made of nickel and zirconium oxide cermets. A set of the cell units 13 are placed between the separators 2, and in the embodiments, a set consists of four cell units 13 which are placed in matrix.

Figure 2:
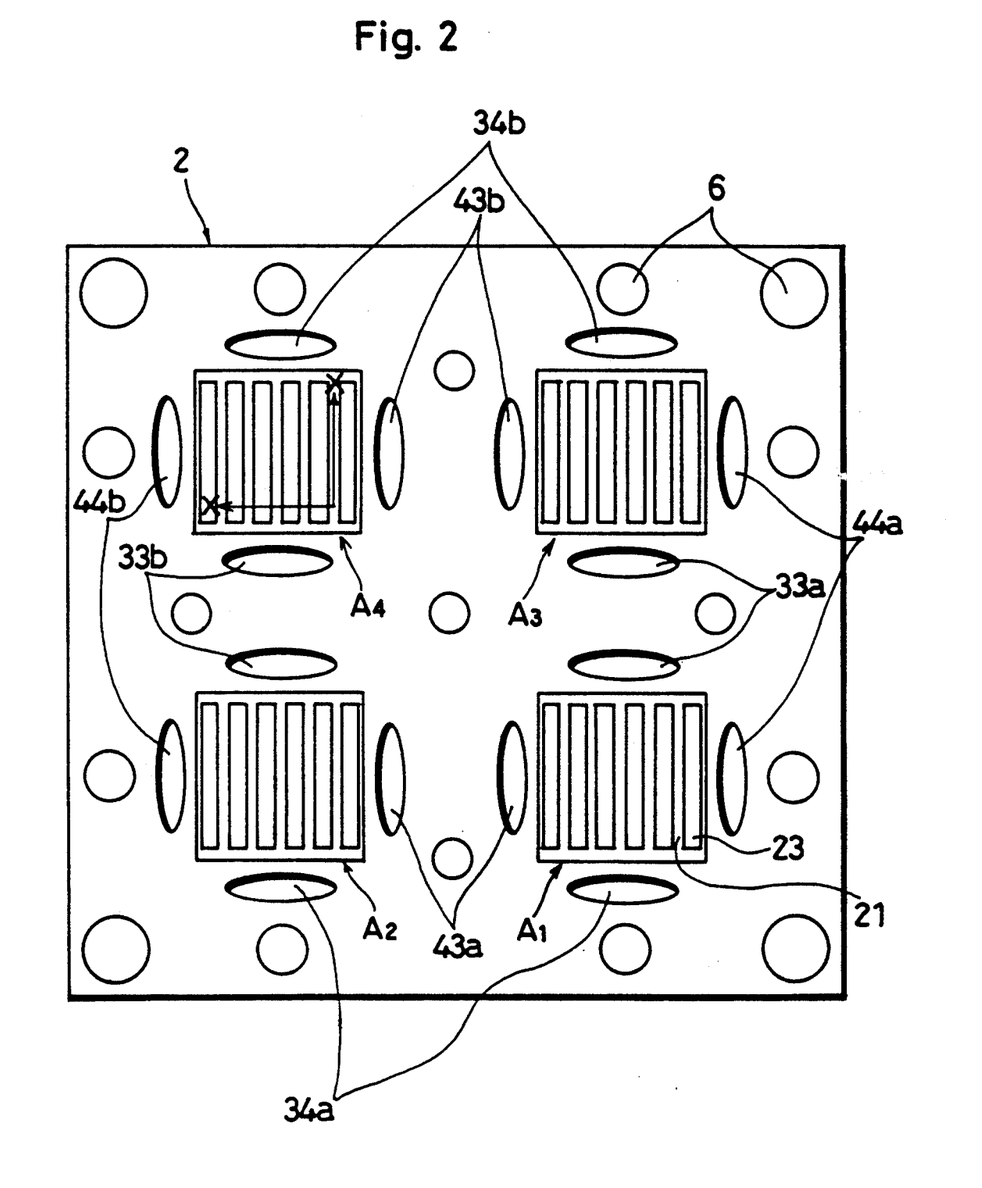
FIG. 2 is a plan view of the separator in a solid oxide fuel cell system of the present invention.

As shown in FIG. 2, each separator 2 has four cell units 13 placed on Areas A$_1$ to A$_4$, respectively, in which fuel gas passages 21 are formed. Also each separator 2 has internal manifolds 33a and 33b for fuel gas supply, internal manifolds 34a and 34b for fuel gas exhaust, internal manifolds 43a and oxidant gas exhaust, and a number of cooling gas holes 6, all of which are formed so as to encircle the Areas A1 to A4.

The internal manifolds 33a and 33b for fuel gas supply, and the internal manifolds 43a and 43b for oxidant gas supply are formed closer to the center of the separators 2 than the internal manifolds 34a and 34b for fuel gas exhaust, and the internal manifolds 44a and 44b for oxidant gas exhaust in order to have each gas flow from inward to outward in each cell unit 13, thereby enhancing thermal efficiency.

The cooling gas holes 6 near the internal manifolds for each gas exhaust are larger in diameter than the ones near the internal manifolds for each gas supply. This is because the internal manifolds for each gas exhaust require more cooling gas due to heat of reaction carried by the exhaust gas. On rear surface of the separator 2, oxidant gas passages 22 are formed within Areas A$_1$ to A$_4$. The ribs 23 placed on both upper and rear surfaces of Areas A$_1$ to A$_4$ form the fuel gas passages 21 and oxidant gas passages 22 as shown in FIG. 3. Therefore, placing the upper ribs 23 and rear ribs 23 at right angles to each other enables the fuel gas and oxidant gas to flow at right angles to each other through their passages.

Figure 6:
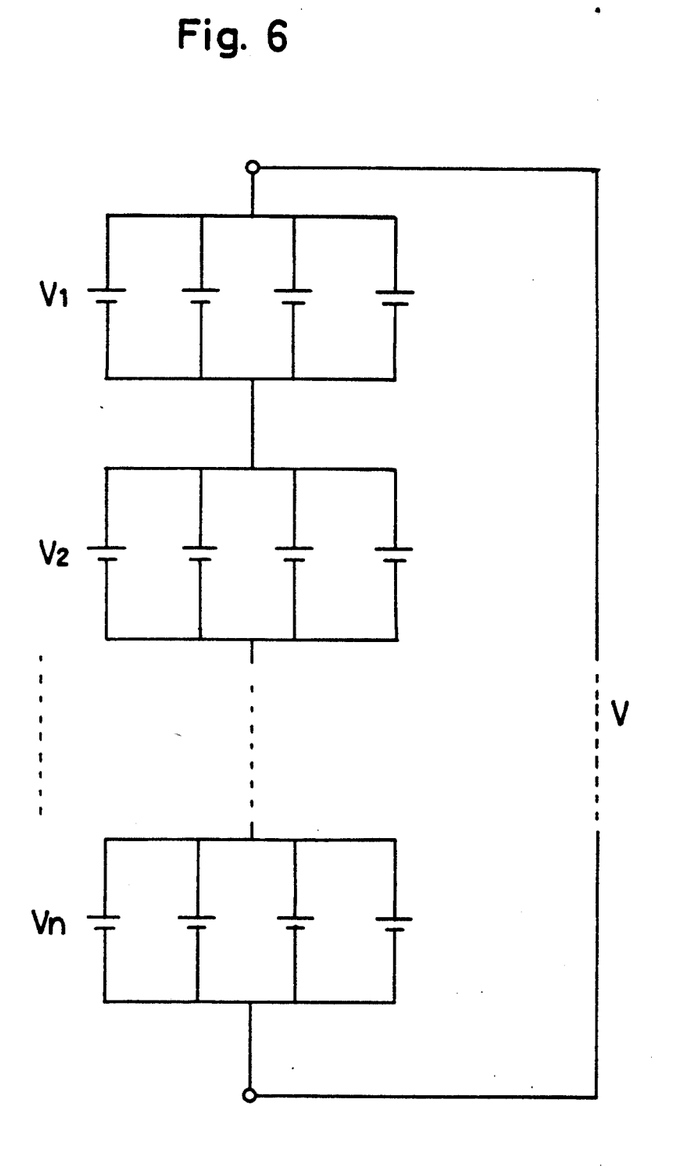
FIG. 6 is a schematic representation of an equivalent circuit of a solid oxide fuel cell system of the present invention.

The separator 2 is an electric conductor made of heat resistant metals such as nickel chrome alloy (Inconel 600, 601), therefore four cell units 13 constitute a serial and equivalent circuit as shown in FIG. 6.

The fuel gas supply/exhaust plate 3 is made of heat resistant metals such as nickel chrome alloy(Inconel 600, 601). On the upper surface thereof, ribs(not shown) having the same construction as the ribs 23 on the separator 2 are placed so that they constitute fuel gas passages to supply the fuel gas to the anodes 12 of four cell units 13 placed thereon.

Figure 4:
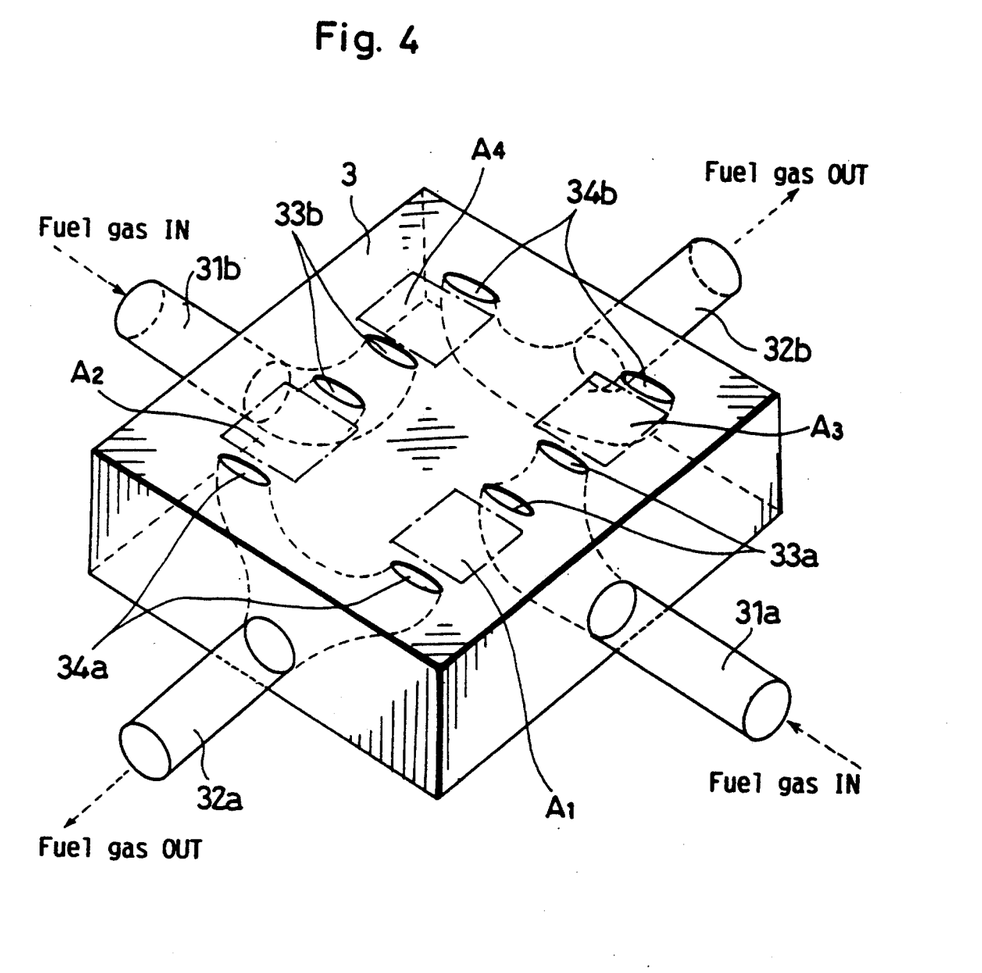
FIG. 4 is a schematic view of the fuel gas supply/exhaust plate of a solid oxide fuel cell system of the present invention.

As shown in FIG. 4, a fuel gas supply pipe 31a is connected to one side surface of the fuel gas supply/exhaust plate 3 and a fuel gas supply pipe 31b to the opposing side surface thereof, both of which are communicated with two internal manifolds 33a for fuel gas supply and two internal manifolds 33b for fuel gas supply, respectively, wherein all internal manifolds are made through the stack 9 in the layered direction. Also a fuel gas exhaust pipe 32a is connected to one side surface of the fuel gas supply plate/exhaust 3 and a fuel gas exhaust pipe 32b to the opposing side surface thereof, both of which are communicated with two internal manifolds 34a for fuel gas exhaust and two internal manifolds 34b for fuel gas exhaust, respectively, wherein all internal manifolds are made through the stack 9 in the layered direction.

The oxidant gas supply/exhaust plate 4 is made of heat resistant metals such as nickel chrome alloy(Inconel 600, 601). On the rear surface thereof, ribs(not shown) having the same construction as the ribs 23 on the separator 2 are placed so that they constitute oxidant gas passages to supply the oxidant gas to the cathodes 11 of four cell units 13 placed underneath.

As shown in FIG. 1, an oxidant gas supply pipe 41a is connected to one side surface of the oxidant gas supply/exhaust plate 4 and an oxidant gas supply pipe 41b to the opposing side surface thereof, both of which are communicated with two internal manifolds 43a for oxidant gas supply and two internal manifolds 43b for oxidant gas supply, respectively, wherein all internal manifolds are made through the stack 9 in the layered direction. An oxidant gas exhaust pipe 42a is connected to one side surface of the oxidant gas supply/exhaust plate 4 and an oxidant gas exhaust pipe 42b to the opposing side surface thereof, both of which are communicated with two internal manifolds 44a for oxidant gas exhaust and two internal manifolds 44b for oxidant gas exhaust, respectively, wherein all internal manifolds are made through the stack 9 in the layered direction.

Figure 5:
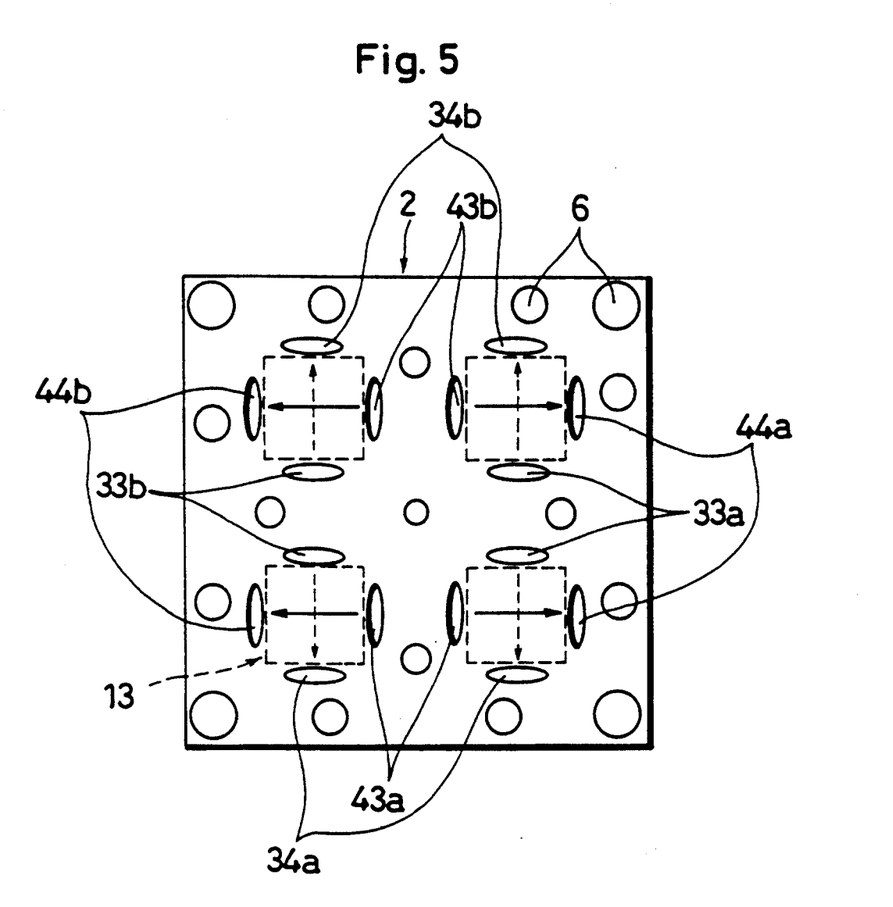
FIG. 5 is a view showing gas flows in a solid oxide fuel cell system of the present invention.

The flow of each gas as well as the cooling gas in the solid oxide fuel cell system assembled as above is described hereunder with referring to FIG. 5, in which a short dashed line indicates the flow of the fuel gas and a full line that of the oxidant gas.

The fuel gas supplied through the fuel gas supply pipes 31a and 31b flows upward through the internal manifolds 33a and 33b for fuel gas supply while it is distributed evenly to the anode 12 in each cell as it passes therethrough, then it flows downward through the internal manifolds 34a and 34b for fuel gas exhaust, respectively, and is released to the atmosphere through the fuel gas exhaust pipes 32a and 32b, respectively.

The oxidant gas supplied through the oxidant gas supply pipes 41a and 41b flows downward through the internal manifolds 43a and 43b for oxidant ga supply while it is distributed evenly to the cathode 11 in each cell as it passes therethrough, then it flows downward through the internal manifolds 44a and 44b for oxidant gas exhaust and is released to the atmosphere through the oxidant gas exhaust pipes 42a and 42b, respectively.

As previously mentioned, the fuel gas and oxidant gas flows at right angles to each other in each cell, with which each cell unit 13 generates electricity through cell reaction.

The cooling gas is supplied through the oxidant gas supply pipes 41a and 41b to each cooling gas hole 6.

The stack assembled as above is referred to as (A) stack hereinafter.

Example 2

A stack was assembled in the same way in the Example 1 except that the cooling gas holes 6 were not formed therein. The stack assembled as above is referred to as (B) stack hereinafter.

Example 3

A stack was assembled in the same way in the Example 1 except that the cooling gas holes 6 were not formed therein and the internal manifolds for each gas supply were replaced with the internal manifolds for each gas exhaust and vice versa in order to have the fuel gas and oxidant gas flow from outward to inward. The stack assembled as above is referred to as (C) stack hereinafter.

Example 4

A stack was assembled in the same way in the Example 1 except that the oxidant gas supply/exhaust plate 4 was placed at the bottom in order to have the fuel and oxidant gas flow in the same direction, in other words, both flew upward. T he stack assembled as above is referred to as (D) stack hereinafter.

Experiment

Figure 7:
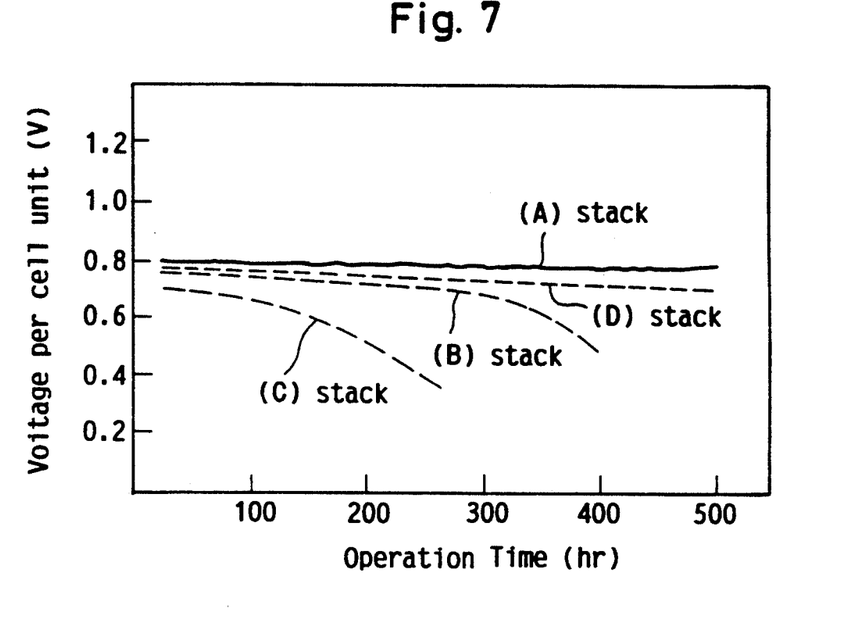
FIG. 7 is a graph showing a correlation between an operation hour and voltage per unit cell in (A)–(D) stacks of the present invention.

A correlation between an operation time (hr) and voltage per unit cell was studied in (A) to (D) stacks, and the result is shown in FIG. 7. The air was used as the oxidant gas and cooling gas and hydrogen was used as the fuel gas. The stacks generated a constant current of 300mA/cm$^2$. Utilization factors for both of the fuel gas and oxidant gas were 30%.

It is apparent from FIG. 7 that (A) stack generated a constant voltage while (B) to (D) stacks did not. In other words, (A) stack retained superior stable life characteristics compare to the others.

The reason for the result is assumed that the uneven temperature occurred in (B) to (D) stacks deteriorated the stack characteristics.

Experiment 2

Figure 8:
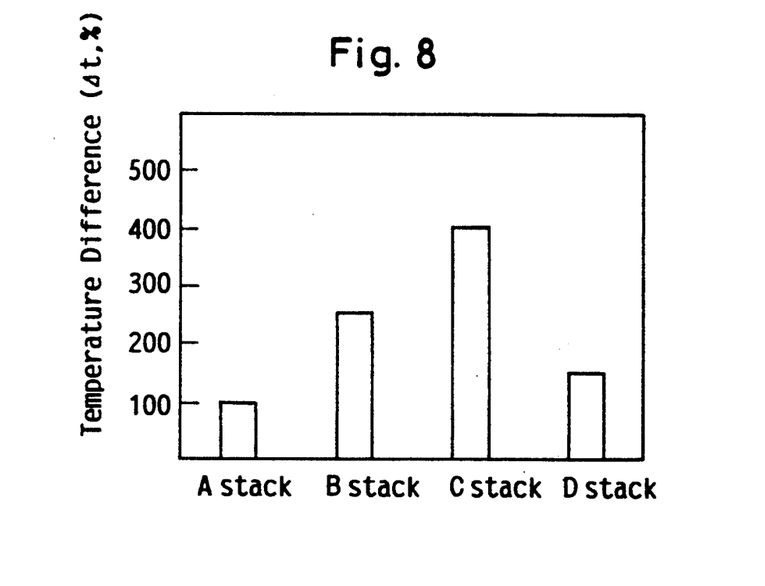
FIG. 8 is a graph showing the temperature differences $\Delta T(\Delta T = T_{max} - T_{min})$ in the (A) to (D) stacks of the present invention, making the temperature difference $\Delta T$ in the (A) stack as 100.

The temperature differences $\Delta T (\Delta T = T_{max} - T_{min})$ in (A) to (D) stacks were studied, and the result is shown in FIG. 8 making the temperature difference $\Delta T$ in the (A) stack as 100.

It is apparent from FIG. 8 that (B) to (D) stacks showed larger temperature differences than that of (A) stack, however, these differences are small compared to the conventional solid oxide fuel cell systems in which one cell unit is placed between the separators.

It should be noted that the stack of the present invention is able to maintain the even distribution of temperature in the surface of each cell unit by having each gas flow from inward to outward therethrough and to maintain the even distribution of temperature in the layered direction by having the fuel and the oxidant gas flow in the layered direction reversely.

Remarks

In the above examples, although a set of cell units consists of four (2×2) cell units 13, six (2×3) or nine (3×3) cell units 13, for instance, can constitute a set of cell units. However, it is preferable to place four cell units 13 in matrix, because all of the internal manifolds for each gas exhausts can be placed near the edge of the separator, therefore, radiation efficiency is enhanced.

Also the cooling gas used as coolant in the example can be supplied separately instead of being supplied together with the oxidant gas from the oxidant gas supply pipes 41a and 41b.

Furthermore, the fuel gas supply/exhaust plate 3 can be place on the top and the oxidant gas supply/exhaust plate 4 can be placed at the bottom.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A solid oxide fuel cell system comprising at least one stack including a layer of a number of cell units and separators alternated with each other, and characterized in that a set of cell units are placed on one surface between the separators, wherein each cell unit in the set is separately placed on the surface crossing at right angles to the layered direction.

2. A solid oxide fuel cell system of claim 1, wherein each cell unit is smaller than the separator and includes an anode, a cathode, and an electrolyte placed therebetween.

3. A solid oxide fuel cell system of claim 2, wherein internal manifolds for fuel gas supply/exhaust and internal manifolds for oxidant gas supply/exhaust are formed around each cell unit, and all of them are formed through the separators.

4. A solid oxide fuel cell system of claim 3, wherein the internal manifolds for each gas supply are formed closer to the center of the separator than the internal manifolds for each gas exhaust.

5. A solid oxide fuel cell system of claim 4, wherein the solid oxide fuel cell system includes construction by which the fuel gas and oxidant gas flow at right angles to each other in each cell unit.

6. A solid oxide fuel cell system of claim 5, wherein the solid fuel cell system has construction by which the fuel and the oxidant gas flow in the layered direction reversely in their internal manifolds.

7. A solid oxide fuel cell system of claim 5, wherein a first gas supply/exhaust plate having a gas supply and a gas exhaust communicating with internal manifolds is placed at one of the bottom and top of the stack, and a second supply/exhaust plate having a gas supply and a gas exhaust communicating with the internal manifolds is placed at the other side of the stack, and wherein the fuel gas is supplied through one of the first and second gas supply/exhaust plates and the oxidant gas is supplied through the other plate.

8. A solid oxide fuel cell system of claim 4, wherein at least one coolant flow path formed through the separators is formed around each cell unit.

9. A solid oxide fuel cell system of claim 8, wherein a number of coolant holes are formed around each cell unit which constitute the coolant flow path in the layered direction, and the coolant holes become larger in diameter in proportion to the distance from the center of the separators.

10. A solid oxide fuel cell system of claim 8, wherein all the coolant holes are placed farther from the cell units than the internal manifolds.

11. A solid oxide fuel cell system comprising at least one stack including a layer of a number of cell units and separators alternated with each other, and characterized in that four cell units are placed on one surface between the separators, wherein each of four cell units is placed in matrix on the surface crossing at right angles to the layered direction.

12. A solid oxide fuel cell system of claim 11, wherein internal manifolds for fuel gas supply/exhaust and internal manifolds for oxidant gas supply/exhaust are formed around each cell unit, and all of them are formed through the separators.

13. A solid oxide fuel cell system of claim 12, wherein the internal manifolds for each gas supply are formed closer to the center of the separator than the internal manifolds for each gas exhaust.

14. A solid oxide fuel cell system of claim 13, wherein the solid oxide fuel cell system includes construction by which the fuel gas and oxidant gas flow at right angles to each other in each cell unit.

15. A solid oxide fuel cell system of claim 14, wherein the solid fuel cell system has construction by which the fuel and the oxidant gas flow in the layered direction reversely in their internal manifolds.

16. A solid oxide fuel cell system of claim 14, wherein a first gas supply/exhaust plate having a gas supply and a gas exhaust communicating with internal manifolds is placed at one of the bottom and top of the stack, and a second supply/exhaust plate having a gas supply and a gas exhaust communicating with the internal manifolds is placed at the other side of the stack, and wherein the fuel gas is supplied through one of the first and second gas supply/exhaust plates and the oxidant gas is supplied through the other plate.

17. A solid oxide fuel cell system of claim 13, wherein at least one coolant flow path formed through the separators is formed around each cell unit.

18. A solid oxide fuel cell system of claim 17, wherein a number of coolant holes are formed around each cell unit which constitute the coolant flow path, and the coolant holes become larger in diameter in proportion to the distance from the center of the separators.

19. A solid oxide fuel cell system of claim 17, wherein all the coolant holes are placed farther from the cell units than the internal manifolds.

* * * * *